Patented June 29, 1948

2,444,241

UNITED STATES PATENT OFFICE 2,444,241

SOY WHIP

Arthur C. Beckel and Letta I. De Voss, Peoria, Paul A. Belter, Pekin, and Allan K. Smith, Peoria, Ill., assignors to the United States of America as represented by the Secretary of Agriculture No Drawing. Application May 21, 1946, Serial No. 671,344

8 Claims. (Cl. 99—14)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

An object of this invention is the manufacture from soybean meal of a light, foamy material without a beany, grassy, or bitter flavor and similar to beaten egg whites. This material makes possible the introduction of the very nutritious but inexpensive soybean protein into candies and like materials which hitherto have consisted almost entirely of carbohydrate materials. Other advantages of this material will become apparent with the description of the method and the material.

In the prior art, a similar light, foamy material has been prepared from soybean meals which have had the soybean oil removed by various solvents such as hexane and ethyl ether. It was not possible, in the prior art, to prepare such a light, foamy material which did not contain the bitter and objectionable flavors, since the oil solvents which were used permitted the distasteful substances to remain in the meal from which they were readily removed, along with the foaming principle, by the aqueous solvents used in the preparation of the foamlike material. It was stated that the material still retains a slight bitterness which cannot be described as raw-beanlike, and which could not be removed by any method tried. The statement also is made in the prior art that "alcohol is unsuitable" for the extraction of oils, since it would "presumably" denature the proteins. See, in this relation, Industrial and Engineering Chemistry, September 1937, page 1010.

We have discovered that, contrary to the teaching of the prior art, soybean meal from which the oil has been removed by ethyl alcohol produces a most acceptable light, foamy material. That this light, foamy material does not contain the objectionable flavors characteristic of other preparations has been determined by organoleptic tests. The reason that these undesirable flavors are absent is due to the fact that bitter substances such as saponins, as well as other such constituents, are present in plant materials as glucosides which are soluble in alcoholic solvents. We have found that an ethyl alcoholic solvent removes a small fraction of the original soybean material in addition to the oil. Included in this fraction of the original bean are the flavors, the various coloring substances, and many other materials some of which have been identified. The soybean meal remaining after alcohol extraction is nearly white and has a bland taste bordering on tasteless. Soybeans extracted with non-alcoholic solvents such as hexane, ethyl ether, trichloroethylene and the like, yield yellowish meal retaining the characteristic beany and bitter principles.

Analytical data obtained at a number of hydrogen ion concentrations (expressed as pH) and showing the differences in non-protein substances as well as protein substances dispersible from soybean flakes extracted with alcohol, on the one hand, and hexane on the other, are presented in the table.

TABLE

Dispersibility of soybean meals in aqueous solutions

| pH of water extraction | 6.6 | | 7.3 | |
|---|---|---|---|---|
| Oil extracted with | Alcohol | Hexane | Alcohol | Hexane |
| 1. Percent total solids dispersal | 44.9 | 54.7 | 41.8 | 62.4 |
| 2. Percent suspended solids | 4.2 | 4.1 | 4.8 | 5.0 |
| 3. Percent dissolved solids | 40.3 | 50.6 | 37.0 | 57.5 |
| 4. Percent protein precipitable at pH 4.6 | 25.2 | 28.0 | 25.3 | 30.1 |
| 5. Percent soluble solids (non-protein) | 15.6 | 22.6 | 11.7 | 27.4 |

It will be seen in line 5 of the table that the percent of solids not recoverable as protein is much less in all cases for alcohol-extracted flakes than for the corresponding hexane-extracted flakes. This corroborates our statement that alcohol removes substances other than oil. Furthermore, this data illustrates an important aspect of our invention, namely, the decrease in non-protein solids content of aqueous dispersions from alcohol-extracted soybean meal as contrasted to meal extracted with hexane or other similar oil solvents.

Utilizing our discovery of the bland foamy material extractable from substantially oil-free soybean meal from which certain other substances have been removed by ethyl alcohol, we have been able to prepare the aqueous extract in such concentrations that a wide variety of other edible substances can be incorporated in the aqueous extract for the preparation of candies, icings, meringues, cookies and/or the like. The additional edible substances may be incorporated in the extract either before or after it is whipped into a foamy material. Substances which we have incorporated include sugar, corn syrup, cooked starch, uncooked starch, glycerine, sodium alginate, vanilla and other flavors, salt, and flour. It must not be inferred that all of these substances are used in any one preparation. One skilled in the culinary art would select those substances required by a given food preparation, and obviously would not be limited by the materials which we have listed.

One example of the process we have invented may be illustrated by its application for the preparation of soy whip to flaked soybeans containing 20 percent of soybean oil. One part of the flaked soybeans is extracted with six parts of ethyl alcohol (95 percent or more by volume), until 95 percent of the oil and an additional portion of the original bean (suitably 12 percent) have been removed by the alcohol. This takes about one hour at the boiling point of the alcohol. The remaining residue, after removing all residual alcohol by evaporation, is about 69 percent of the original bean. To 100 parts of this residue are added 500 parts of water, and after 30 minutes' soaking, the liquid extract is strained from the residue. (The entire mixture may be used without straining off the residue. The extract may also be evaporated to dryness after straining.) This resulting liquid is of such concentration of the foaming principle, that it may be whipped to a foam by mechanical means and may then be used for culinary purposes. We prefer to use about 3 to 10 parts of water per part of residue.

We do not limit ourselves to this method of operation, since other procedures are at once apparent to those skilled in the art. For example: other ingredients may be incorporated before whipping; the entire liquid mixture before straining may be utilized in certain foods; the liquid extract may be evaporated to dryness in some sort of rapid dryer to simplify storage and shipment; other ingredients may be combined with the dried extract so that, on the addition of water followed by whipping, a complete food mixture is forthcoming. These and many other modified treatments become possible with the product of our process.

Having thus described our invention, we claim:

1. The process of making a soy whip comprising extracting soybean material containing about 20 percent of soybean oil with ethyl alcohol at about the boiling point of the alcohol and for about one hour until about 95 percent of the oil and about 12 percent of the original bean have been removed by the alcohol; removing the extract from the residue; evaporating residual alcohol from the residue; soaking the residue in water; separating the aqueous extract from the residue; and aerating the aqueous extract.

2. The process of making a soy whip comprising extracting soybean material containing about 20 percent of soybean oil with hot ethyl alcohol until about 95 percent of the oil and about 12 percent of the original bean have been removed by the alcohol; treating the residue with water to form an aqueous dispersion; and aerating the dispersion to form a soy whip.

3. The process of making a soy whip comprising extracting soybean material containing the soybean oil with hot ethyl alcohol until the remaining residue contains about 69 percent of the original bean; removing residual alcohol from the residue; extracting the residue with about 3 to 10 parts of water; and aerating the residue.

4. The process of making a food whip comprising extracting soybean material containing the soybean oil with ethyl alcohol; then extracting the soybean meal residue with about 3 to 10 parts water; then aerating the water extract.

5. The process of making a food whip comprising extracting soybean material containing the soybean oil with ethyl alcohol; then extracting the soybean meal residue with about 3 to 10 parts water; then aerating the water extract and adding a thickening agent.

6. A soy whip comprising the aerated aqueous extract of soybean material from which material the alcohol soluble matter, comprising the oil and bitter substances, has been removed by extraction of soybean oil-containing soybean material with alcohol.

7. The product of the process of claim 1.

8. The product of the process of claim 5.

ARTHUR C. BECKEL.
LETTA I. DE VOSS.
PAUL A. BELTER.
ALLAN K. SMITH.

REFERENCES CITED

The following references are of record in the file of this patent:

"A Study of Protein Extract from Soybeans," J. Agri. Research, vol. 57, No. 10, Nov. 15, 1938, pages 737–746.

"An Active Whipping Substance from Soybean Flour," Ind. and Eng. Chem., Oct. 1939, pages 1282 and 1283.